United States Patent [19]
Idziak

[11] Patent Number: 5,816,903
[45] Date of Patent: Oct. 6, 1998

[54] APPARATUS FOR SEPARATING SAUSAGES

[76] Inventor: Peter Idziak, 5958 S. Kostner Ave., Chicago, Ill. 60629

[21] Appl. No.: 649,028

[22] Filed: May 16, 1996

[51] Int. Cl.⁶ .................................................. A22C 11/00
[52] U.S. Cl. ............................................. 452/49; 452/48
[58] Field of Search ........................................ 452/49, 48

[56] References Cited

U.S. PATENT DOCUMENTS

| | | |
|---|---|---|
| 3,716,891 | 2/1973 | Demarest . |
| 3,808,636 | 5/1974 | Gouba . |
| 3,840,937 | 10/1974 | Berg et al. . |
| 4,104,763 | 8/1978 | Tetsuro . |
| 4,194,268 | 3/1980 | Deerwester ............................... 452/49 |
| 4,214,492 | 7/1980 | Hoffman ................................... 452/49 |
| 4,233,709 | 11/1980 | Smith et al. . |
| 4,322,871 | 4/1982 | Townsend et al. . |
| 4,366,600 | 1/1983 | Townsend et al. . |
| 4,373,231 | 2/1983 | Mano . |
| 4,438,545 | 3/1984 | Kupcikevicius et al. ................. 452/48 |
| 4,463,477 | 8/1984 | Ziolko . |
| 4,463,641 | 8/1984 | Sato . |
| 4,584,740 | 4/1986 | Townsend . |
| 4,847,951 | 7/1989 | Kollross .................................... 452/48 |
| 5,131,884 | 7/1992 | Melanson et al. . |

Primary Examiner—Willis Little
Attorney, Agent, or Firm—Wallenstein & Wagner, Ltd.

[57] ABSTRACT

An air-powered apparatus (10) for separating a string of sausages (S) connected by twisted casings (TC) is provided. The apparatus (10) has a first sausage mouth (46) spaced from a second sausage mouth (48) defining a cutting zone (C). Each sausage mouth (46,48) has a slot (54) for receiving a twisted casing (TC) connecting adjacent sausages. A first knife (70) is movably supported in the first sausage mouth (46), and a second knife (72) movably supported in the second sausage mouth (48). A tensioning cylinder (76) has a fixed end and an extendable end connected to the first sausage mouth (46) to move the first sausage mouth (46) relative to the second sausage mouth (48) to stretch the twisted casing (TC). A first cutting cylinder (66) has a fixed end and an extendable end connected to the first knife (70) for moving the first knife (70) into the cutting zone (C). A second cutting cylinder (68) has an extendable end connected to the second knife (72) for moving the second knife (72) into the cutting zone (C) . A first pilot valve (88) is provided where, upon actuation, the first pilot valve (88) delivers fluid to the tensioning cylinder (76) to stretch the twisted casing (TC). A second pilot valve (90) is provided where, in response to the actuation of the first pilot valve (88), the second pilot valve (88) is actuated which delivers fluid to the cutting cylinders (66,68) to immediately sever the twisted casing (TC).

19 Claims, 4 Drawing Sheets

APPARATUS FOR SEPARATING SAUSAGES

DESCRIPTION

1. Technical Field

This invention relates generally to an apparatus for separating interconnected food product, such as sausages and, more particularly, concerns a simple, low-maintenance machine that quickly and efficiently severs a twisted casing connecting two adjacent sausages.

2. Background of the Invention

Sausages, including salamis, hot dogs and the like, are typically manufactured by filling an elongated casing with a particular meat product. The length of the sausage is determined by twisting or tying off the casing periodically along its length creating a string of individual sausages, or sausage links, interconnected by the twisted casings. In certain sausage processing applications, a pair of spaced metal clips are secured around the twisted casing between adjacent sausages to maintain the integrity of the twisted casings and sausages.

Once formed into a string of sausages, the sausages are generally further processed in a smokehouse to form the finished product. The sausage strings are then separated, by severing the twisted casings between adjacent sausage links, to form individual sausages for packaging and sale.

Many machines have been designed over the years for severing sausage strings into individual sausages. A number of the machines have been designed to be fully automated. These machines have conveyor systems, sensing mechanisms and are usually computer controlled. In severing the sausage strings, one problem that occurs is the accidental severing of the sausage, or sausage link, itself rather than the twisted casing. Because the commercial value of a sausage link is ruined if the link itself is severed in two, it is important for the machine to only cut the twisted casing and not the sausage link. Some prior art machines have employed complex sensing mechanisms such as mechanical feeler arms and optical sensors for sensing the twisted casings between the links. The sensing mechanism then communicates with the cutting mechanism to sever the twisted casing from the sausages. The sensing mechanisms sometimes make false readings and activate the cutting mechanism at the incorrect time thus severing the sausage in two. 1 Furthermore, the sensing mechanisms add to the complexity and cost of the machine. Also, as the complexity of the machine increases, the cost of operating and maintaining the machine also increases.

Consequently, sausage processing facilities often do not realize cost benefits with such complex, automated machines. These facilities prefer to separate the sausages using a manually operated machine. To this end, some less complex machines have been designed for an operator to manually sever the twisted casing from adjacent sausages. One type of machine operates on compressed air. The machine is equipped with an air cylinder that operates a cutting mechanism to cut the twisted casings. The cutting mechanisms employed are plier-type cutters or a hammer/anvil assembly. As understood by Applicant, however, these machines have been found undesirable because they are slow and require a large air cylinder to operate the cutting mechanism. This, in turn, requires a large amount of compressed air for operation. As a result, these machines, although less complex than the automated machines, remain too expensive to manufacture and operate.

SUMMARY OF THE INVENTION

Accordingly, it is an object of the invention to provide a machine that quickly and efficiently severs a twisted casing connecting two adjacent sausages.

According to a first aspect of the invention, an apparatus for separating a string of sausages connected by twisted casings is provided. The apparatus has a pair of sausage mouths dimensioned to receive a twisted casing connecting adjacent sausages. Means for moving one of the sausage mouths relative to the other sausage mouth is provided to stretch the twisted casing and define a stretched position. Finally, means are provided for severing the twisted casing while in the stretched position.

According to another aspect of the invention, a tensioning mechanism is provided to stretch the twisted casing to define a stretched position. A cutting mechanism is provided to sever the twisted casing while in the stretched position. A first pilot valve, having a signal inlet and an outlet, delivers fluid, preferably compressed air to the tensioning mechanism. A second pilot valve, having a signal inlet and an outlet, delivers fluid, preferably compressed air to the cutting mechanism. A conduit connects the outlet of the first pilot to the tensioning mechanism. Means are provided for activating the first pilot signal inlet to deliver compressed air to the tensioning mechanism. Means are also provided for activating the second pilot signal inlet, in response to the activation of the first pilot, to deliver compressed air to the cutting mechanism. In such configuration, the twisted casing is stretched to the stretched position and then immediately severed.

In a further aspect of the invention, a support frame is provided having a table to support the string of sausages. The table has an opening through which the sausage mouths extend. The height of the sausage mouths with respect to the table can be adjusted. This allows the sausage mouths to better accommodate sausages of different diameters. The spacing between the sausage mouths can also be adjusted. This allows the sausage mouths to accommodate strings of sausages having twisted casings of different lengths. In another aspect of the invention, the cutting knives are dimensioned so the twisted casing is propelled from the sausage mouths after being severed.

Other features and advantages of the invention will be apparent from the following specification taken in conjunction with the following drawings.

DETAILED DESCRIPTION OF THE INVENTION

While this invention is susceptible of embodiments in many different forms, and will be described in detail, a preferred embodiment of the invention is disclosed with the understanding that the present disclosure is to be considered as exemplifications of the principles of the invention and are not intended to limit the broad aspects of the invention to the embodiments illustrated.

Figure 1:
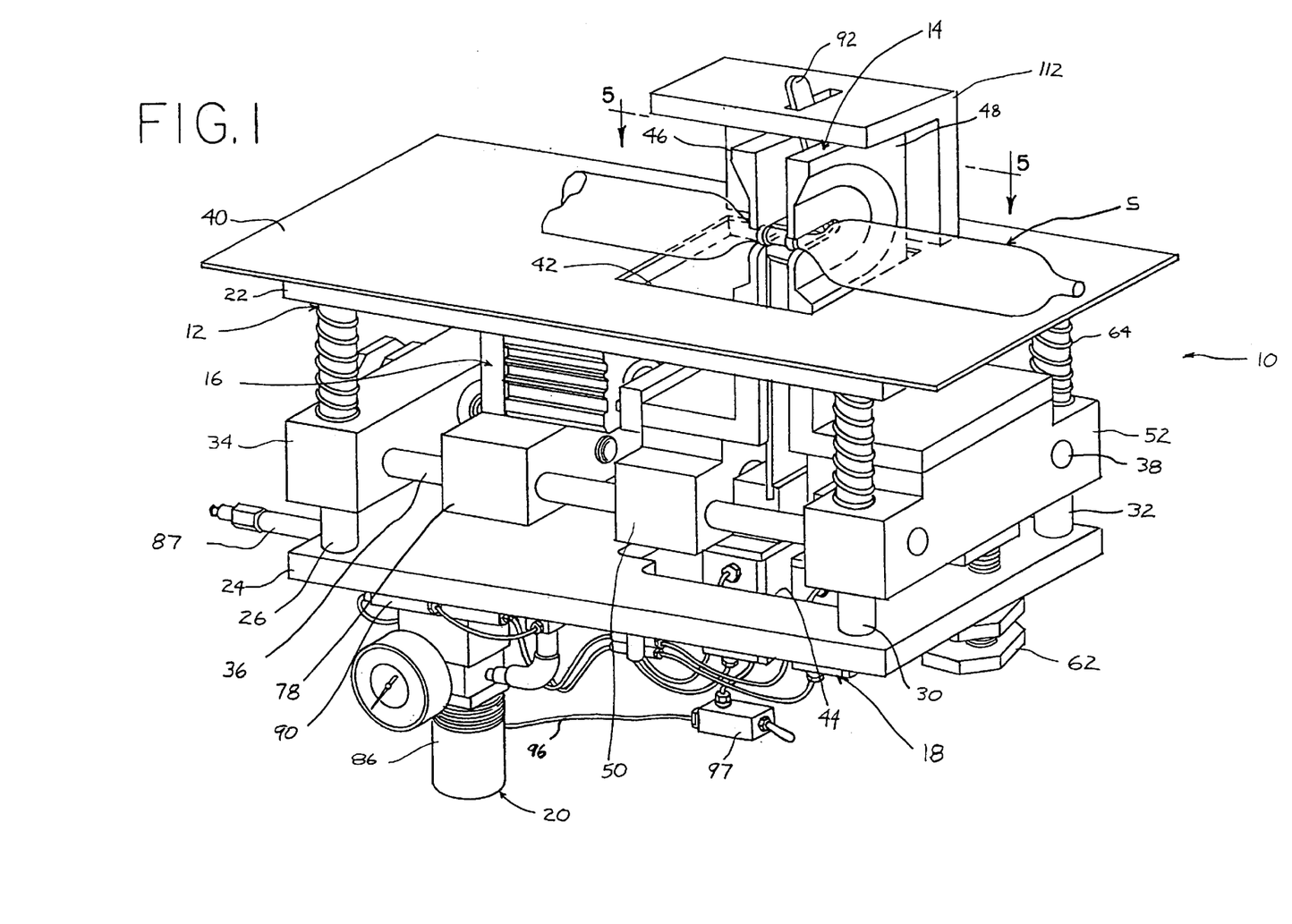
FIG. 1 is a perspective view of a sausage cutter of the present invention showing a partial string of sausages where one of the twisted casings is received by a pair of sausage mouths.

Referring to the drawings, FIG. 1 shows a perspective view of the sausage cutter of the present invention, generally designated by the reference numeral 10. The sausage cutter 10 generally includes a support frame 12, a sausage holder assembly 14, a tensioning mechanism 16, a cutting mechanism 18 and fluid system 20 which controls the operation of the sausage cutter 10. The structure of these elements will be described first, and then the operation of the sausage cutter 10 will be described.

Structure of the Sausage Cutter

As shown in FIG. 1, the support frame 12 provides a box-like structure for supporting the other elements of the sausage cutter 10. The support frame 12 generally includes a pair of frames 22,24 connected by a plurality of support shafts 26,28,30,32 and brackets 34,50,52,78. An upper frame 22 is connected to a lower frame 24 by a first pair of shafts, or first and second vertical support shafts 26,28 at one end of the support frame 12, and by a second pair of shafts, or third and fourth vertical support shafts 30,32 at the other end of the support frame 12 to form a box-like structure. The first and second support shafts 26,28 pass through a support bracket 34 positioned between the frames 22,24 at the one end of the support frame 12. The third and fourth support shafts 30,32 pass through a second mounting bracket 52. A pair of horizontal support shafts 36,38 are supported by and positioned between the support bracket 34 and the second mounting bracket 52. The horizontal support shafts 36,38 support a tension bracket 78 positioned adjacent to the support bracket 34 and a first mounting bracket 50 positioned adjacent to the second mounting bracket 52. The mounting brackets 50,52 and tension bracket 78 will be described in greater detail below. The upper frame 22 supports a stainless steel table 40 which supports a string of sausages S during operation. Any part of the sausage cutter 10 which will come in contact with the sausages is constructed of stainless steel in accordance with government food standards. The plate 40 and upper frame 22 have corresponding openings 42 to accommodate the sausage holder assembly 14. The lower plate 24 has an opening 44 to accommodate the cutting mechanism 18.

Figure 2:
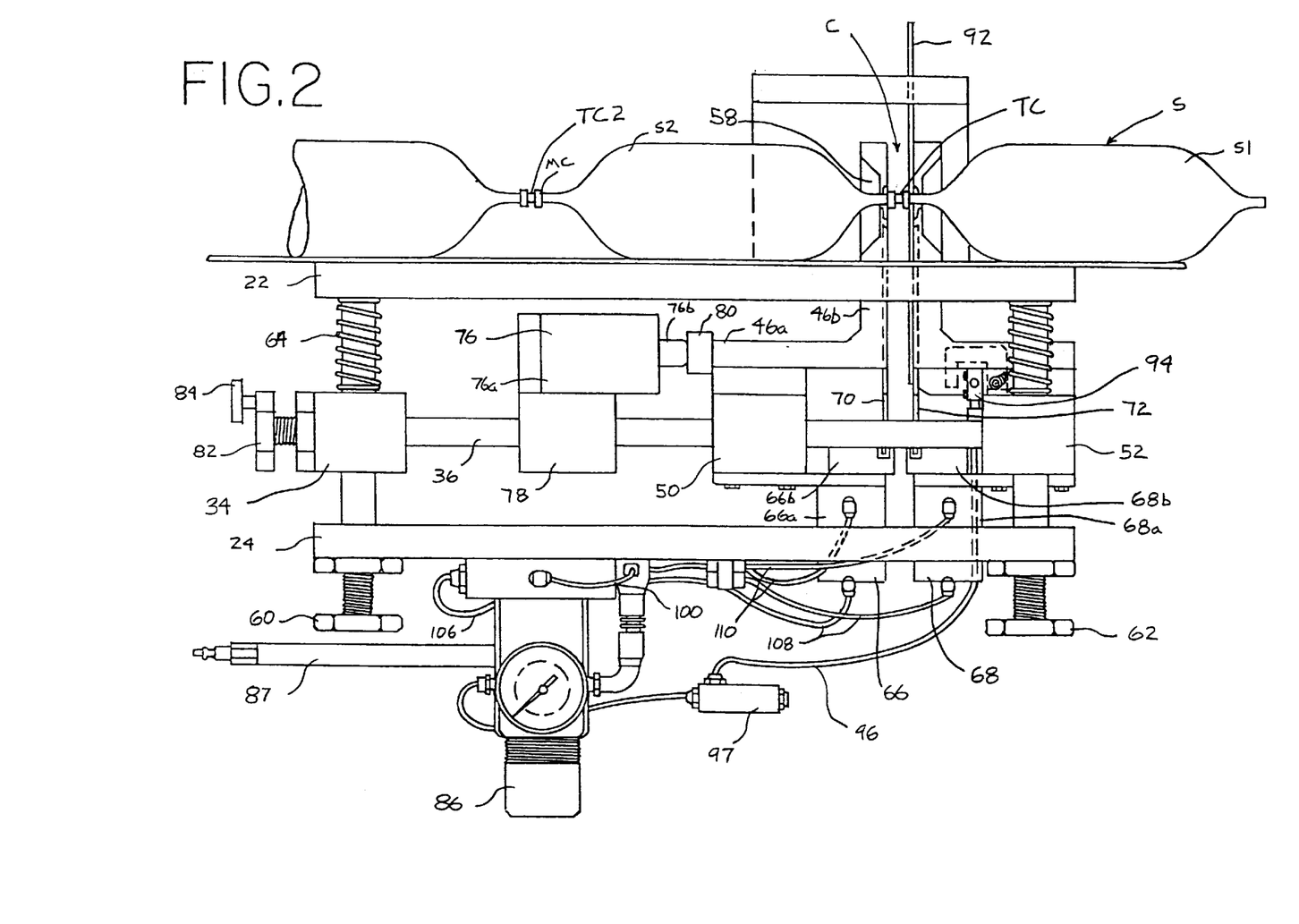
FIG. 2 is a rear elevational view of the sausage cutter of FIG. 1, the pair of sausage mouths being spaced a predetermined distance.
Figure 4:
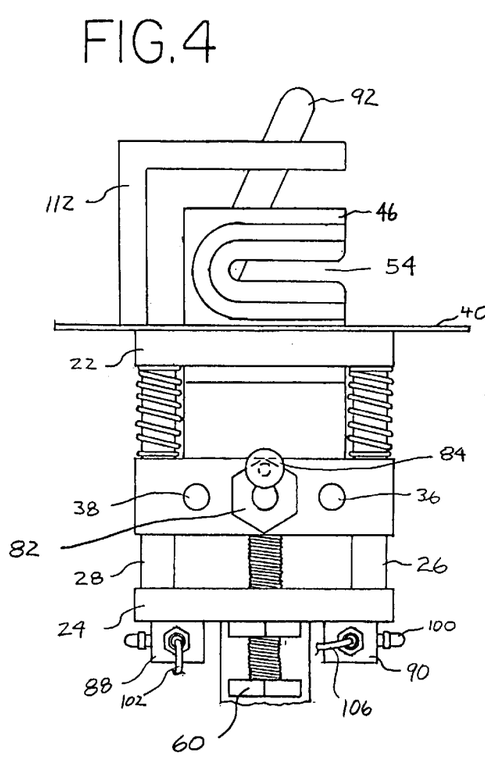
FIG. 4 is a partial end elevational view of the sausage cutter of FIG. 1.
Figure 5:
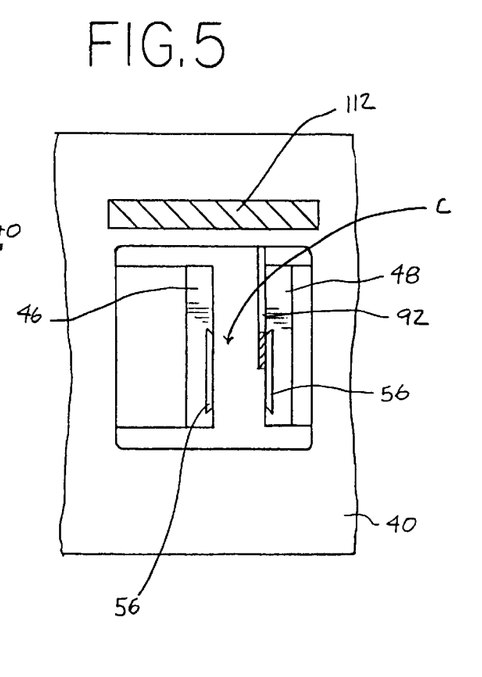
FIG. 5 is a partial sectional view of the sausage cutter taken along line 5—5 in FIG. 1 showing the sausage mouths.

As further shown in FIG. 1, the sausage holder assembly 14 generally includes a first sausage mouth 46 and a second sausage mouth 48. The sausage mouths 46,48 are generally positioned in confronting relation. The first sausage mouth 46 is mounted on the first mounting bracket 50 and the second sausage mouth 48 is mounted on the second mounting bracket 52. Preferably, the sausage mouths 46,48 are spaced from one another to define a cutting zone "C" (FIG. 2). The first sausage mouth 46 will be described in detail with the understanding that the second sausage mouth 48 has generally similar features. As shown in FIG. 2, the first sausage mouth 46 includes a horizontal portion 46a adjoining an upright portion 46b. The horizontal portion 46a is mounted on the first mounting bracket 50. The upright portion 46b of the first sausage mouth 46 extends upwardly through the openings 42 in the upper frame 22 and table 40. The upright portion 46b has a slot 54 (FIG. 4) for receiving a twisted casing TC between adjacent sausages. As shown in FIG. 5, an inside surface of the first sausage mouth 46 includes a generally trapezoidal groove 56 for movably supporting a knife of the cutting mechanism 18 to be described in greater detail below. As seen in FIG. 2, an outside surface of the upright portion 46b has a recess 58 to accommodate a tapered end of a sausage S2.

The height of the sausage mouths 46,48 with respect to the table 40 can be adjusted. As shown in FIG. 2, a pair of vertical adjusting members are threaded through openings on opposite sides of the lower frame 24. A first vertical adjusting member 60 is connected to the support bracket 34 and a second vertical adjusting member 62 is connected to the second mounting bracket 52. Rotation of the vertical adjusting members 60,62 in either direction will raise and lower the support bracket 34 and second mounting bracket 52 along the vertical support shafts 26–32. This, in turn, controls the height of the sausage mouths 46,48 with respect to the table 40. Springs 64 are provided on the vertical support shafts 26–32 between the upper frame 22 and the brackets 34,52 to eliminate "play."

As shown in FIGS. 1 and 2, the cutting mechanism 18 generally includes a pair of cutting fluid cylinders and knives. It is understood, however, that a single cylinder/knife assembly could be used as well as a single cylinder and a pair of knives. The fluid cylinders are preferably air cylinders although other fluid cylinders could also be used. The air cylinders are conventional cylinders and can be obtained, for example, from the SMC Company in Indianapolis, Ind. In the preferred embodiment, the cutting air cylinder has a 1 inch bore and 1 inch stroke although variations are possible. Each cutting air cylinder has a fixed, or base end, and an extendable end. The first air cylinder 66 has its base end 66a connected to the first mounting bracket 50. The extendable end 66b of the first air cylinder 66 supports a first knife 70. The first knife 70 is vertically movable in the groove 56 of the first sausage mouth 46 by the fluid system 20 to be described below. Likewise, a second cutting air cylinder 68 has its base end 68a connected to the second mounting bracket 52. The extendable end 68b of the second air cylinder 68 supports a second knife 72. The second knife 72 is vertically moveable in the groove 56 of the second sausage mouth 48 by the fluid system 20. The respective vertical strokes of the first and second cylinders 66,68 are such that the knives 70,72 extend into the cutting zone C passed the slots 54 in the sausage mouths 46,48 to completely sever a twisted casing TC.

As shown in FIG. 1, a guard 112 is supported on the table 40 and is positioned about the sausage mouths 46,48. The guard 112 helps to minimize the possibility of an operator being accidentally cut by the knives 70,72 when operating the sausage cutter 10.

Figure 3:
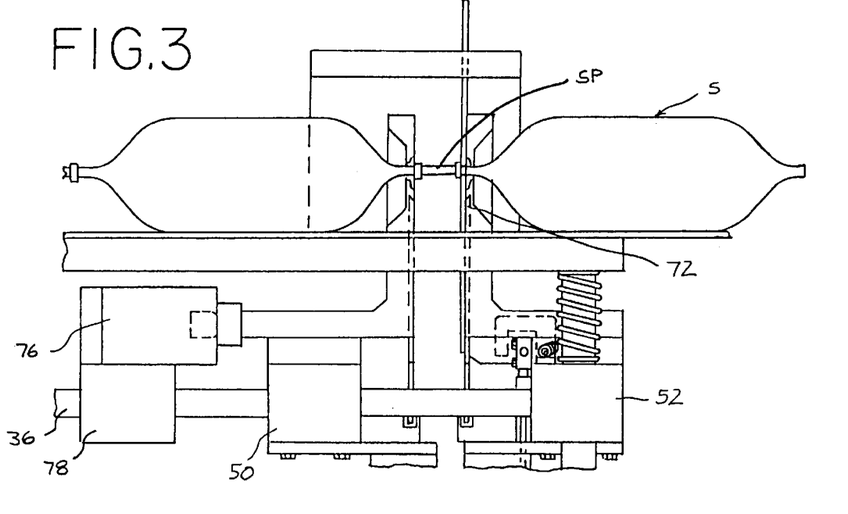
FIG. 3 is a partial rear elevational view of the sausage cutter of FIG. 2 showing the sausage mouths further spaced to stretch the twisted casing.

The tensioning mechanism 16 is designed to stretch a twisted casing TC before it is severed by the cutting mechanism 18. As shown in FIGS. 1–2, the tensioning mechanism 16 generally includes a tensioning fluid cylinder 76 and a tension bracket 78. The fluid tensioning cylinder is preferably an air cylinder although other fluid cylinders could also be used. The tensioning air cylinder can also be obtained from the SMC Company. In the preferred embodiment, the tensioning air cylinder has a 1¼ inch bore and a ⅜ inch stroke although variations are possible. The tension bracket 78 is movably supported on the horizontal support shafts 36,38. The base end 76a of the tensioning air cylinder is mounted on the tension bracket 78. The extendable end 76b of the tensioning cylinder 76 is connected to the horizontal portion 46a of the first sausage mouth 46 via a tension bracket end 80. As will be described in greater detail below, the extendable end 76b of the tensioning cylinder 76 is extended (FIG. 2) when the first sausage mouth 46 is in its initial position, spaced at a predetermined distance. As shown in FIG. 3, the extendable end 76b is retracted into the tensioning cylinder 76 when the first sausage mouth 46 is further spaced from the second sausage mouth 48 to stretch the twisted casing. As the tensioning cylinder 76 extends and retracts, the first mounting bracket 50 moves along horizontal support shafts 36,38 thus moving the first sausage mouth 46, first cutting cylinder 66 and first knife 70 relative to the second sausage mouth 48 etc. It will be understood that the tensioning mechanism 16 could be connected to the other sausage mouth 48.

The tensioning mechanism 18 is equipped with an adjuster to set the initial spacing of the first and second sausage mouths 46,48 at a predetermined distance. If desired, however, the sausage mouths 46,48 could be positioned immediately adjacent one another. As shown in FIGS. 2 and 4, a threaded adjusting member 82 is fed through a threaded opening in the support bracket 34. The adjusting member 82 is connected to the tension bracket 78. Rotation of the adjusting member 82 in either direction will be move the tension bracket 78 along the horizontal support shafts 36,38. This, in turn, will move the first sausage mouth 46 relative to the second sausage mouth 48 to set the initial spacing between the sausage mouths 46,48. A lock 84 is provided on the member 82 to maintain the spacing of the sausage mouths 46,48 initially set.

Figure 7:
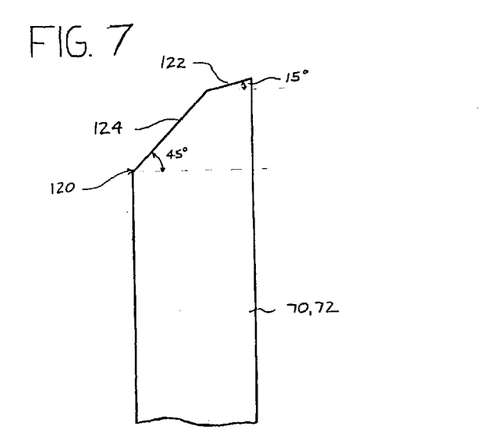

FIG. 7 shows an enlarged end elevational view of the knife 70. It is understood that knife 72 has similar features. The knife 70 has a blade portion 120 for cutting the twisted casing TC. The blade portion 120 preferably has a first incline portion 122 at a 15° angle and a second incline portion 124 at a 45° angle. The inclined portions face the metal clips MC on the twisted casing TC.

Plates (not shown) are also provided with the support frame 12. The plates are mounted to the upper and lower frames 22,24 on the four sides of the support frame 12 to enclose the area between the upper and lower frames 22,24.

Figure 6:
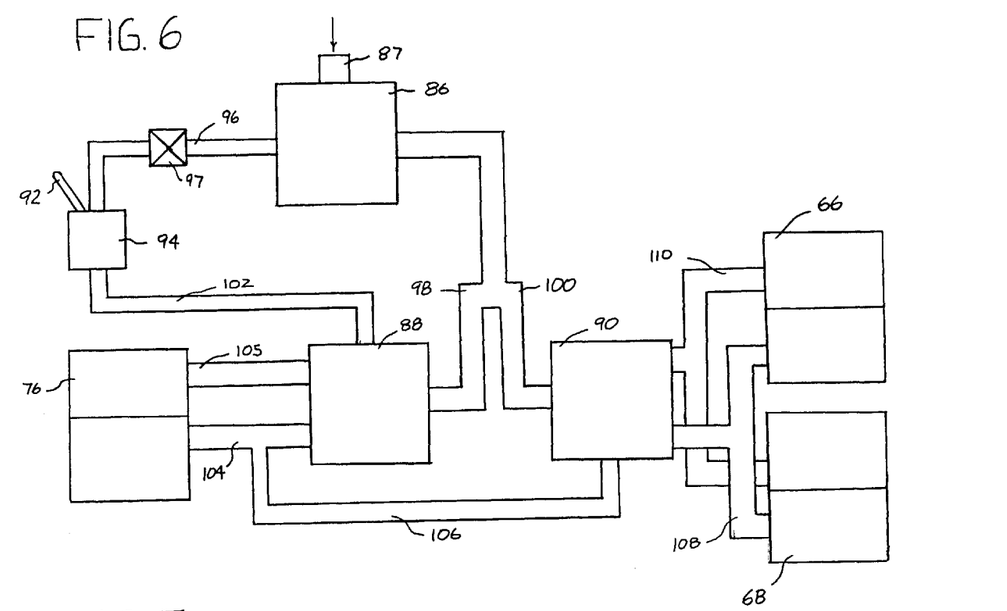
FIG. 6 is a schematic diagram of the pneumatic system of the sausage cutter of FIG. 1; and, FIG. 7 is an enlarged end elevational view of one of the cutting knives used in the sausage cutter of FIG. 1.

FIGS. 1, 2, 4 and 6 generally show the fluid system 20 used to power the sausage cutter 10. The fluid system 20 is preferably a pneumatic system used to feed compressed air to the three air cylinders 66,68,76 to power the sausage cutter 10. No electrical power or other power sources are required to operate the sausage cutter 10, only compressed air. This feature helps in making the machine of the present invention cheaper to manufacture, operate and maintain than prior machines. The particular configuration of the pneumatic system allows the sausage cutter to operate faster and more efficient than previous manually operated machines. FIG. 6 shows a schematic diagram of the pneumatic system. The pneumatic system 20 generally includes a pressure regulator and associated valving, switches and air conduits. Portions of the pneumatic system provide signal air to the valves while other portions provide working air to the cylinders. This will be described in greater detail when describing the operation of the sausage cutter 10 below.

The pneumatic system is generally mounted on the underside of the lower frame 22. As shown in FIG. 2, an air pressure regulator 86 is mounted as such and receives compressed air from an external source through supply conduit 87. The pressure regulator 86 regulates the air to approximately 80–90 psi. A pair of pilot valves are also mounted on the underside of the lower frame (FIG. 4). Each pilot valve has a signal inlet, a working inlet and a pair of outlets. A first pilot valve 88 controls movement of the tensioning cylinder 76 and a second pilot valve 90 controls movement of the cutting cylinders 66,68. An actuator lever 92 is positioned within the cutting zone C defined by the sausage mouths 46,48. A bottom end of the lever 92 (FIG. 2) is connected to a conventional micro-switch 94 assembly which, when its contacts are made, will activate the cutting process. It is understood that the actuator lever 92 could be located in other positions but is preferably located between the sausage mouths. Other conventional means could also be used to activate the micro-switch assembly.

Referring to FIG. 6, the pressure regulator 86 has two main outlets. A first outlet is placed in communication with the micro-switch assembly 94 via a safety conduit 96. The safety conduit 96 has a safety valve 97 which, when closed, prevents signal air from reaching the micro-switch assembly 94. In this configuration, the sausage cutter 10 will not operate. A second outlet is placed in communication with the working inlet of the first pilot valve 88 and the working inlet of the second pilot valve 90 by a first supply conduit 98 and a second supply conduit 100 respectively. A first signal conduit 102 runs from the micro-switch assembly 94 to the signal inlet of the first pilot valve 88. A tensioning conduit 104 runs from one outlet of the pilot valve 88 to the tensioning cylinder 76. A detensioning conduit 105 runs from the other outlet of the first pilot 88 to the tensioning cylinder 76.

A second signal conduit 106 runs from the tensioning conduit 104 to the signal inlet of the second pilot valve 100. One outlet of the second pilot valve 100 is connected to the first and second cutting cylinders 66,68 via a cutting conduit 108. Another outlet of the second pilot valve 100 is connected to the cutting cylinders 66,68 via a return conduit 110.

With the sausage cutter 10 fully constructed as in FIG. 1, it is then supported by a larger table (not shown) for operation. The larger table has a cut-out portion to receive the sausage cutter 10 which is secured to the larger table. An operator can then operate the sausage cutter from either a standing or sitting position depending on the size of the larger table.

The operating sequence of the sausage cutter 10 will now be described.

Operation of the Sausage Cutter

Before operating the sausage cutter 10, the machine is placed in its starting mode. Pressurized air from an external source is supplied to the pressure regulator 86 via supply conduit 87. The safety valve 97 is opened to supply signal air to the micro-switch assembly 94. Compressed air is supplied to the tension cylinder via the detensioning conduit 105. This places the tension cylinder 76 is in its initial extended position to space the sausage mouths 46,48 at the predetermined distance selected. Compressed air is also supplied to the cutting cylinders 66,68 via the return conduit 110. This places the cutting cylinders 66,68 in their retracted positions so the knives 70,72 are below the slots 54 in the sausage mouths 46,48.

An operator then positions himself/herself behind the guard 112 shown in FIG. 2. The string of sausages S are laid on the table. By grasping two adjacent sausages S1,S2, the operator positions the adjoining twisted casing TC into the slots 54 of the sausage mouths 46,48. The operator pulls the sausages towards himself/herself through the slots 54 so the twisted casing TC contacts the actuator lever 92 (FIG. 4). The ensuing displacement of the actuator lever 92 makes up the contacts of the micro-switch assembly 94. This sends signal air through the safety conduit 96, through the first signal conduit 102 and to the signal inlet of the first pilot valve 88, activating the pilot valve 88. Compressed air used to activate the valves is referred to as "signal air" and the compressed air used to power the tensioning cylinder and cutting cylinders is referred to as "working air." Once activated, the first pilot valve 88 sends working air from the first supply conduit 98 through the tensioning conduit 104 and to the tensioning cylinder 76. As shown in FIG. 3, the tensioning cylinder 76 then retracts to further space the first sausage mouth 46 from the second sausage mouth 48. This, in turn, tensions the twisted casing TC in the sausage mouths 46,48 to define a stretched position SP. While working air is being supplied to the tensioning cylinder 76, a portion of this working air is branched off of the tensioning conduit 104 through the second signal conduit 106 and supplied to the signal inlet of the second pilot valve 90, activating the second pilot valve 90. Once activated, the second pilot valve 90 sends working air from the second supply conduit 100 through the cutting conduit 108 to the cutting cylinders 66,68. The cylinders 66,68 then extend to move the knives 70,72 past the slots 54 in the cutting zone C. The blade portions 120 of the knives 70,72 then sever the twisted casing TC.

As previously described, the blade portions 120 have first and second incline portions 122,124 at a 15° angle and a 45° angle respectively. In such configuration, the second incline portions 124 propel the cut twisted casing TC out of the cutting zone C from the sausage mouths 46,48. This way, the twisted casing TC lands on the table 40, or beyond, rather than falling through openings 42 where it could possibly interfere with the operation of the machine. The smaller angle of the first incline portion 122 makes the tip of the knife more rigid in case the knife accidently hits the metal clip MC on the twisted casing TC. Previous knives having a single incline portion crack prematurely, especially if contacting the metal clips MC, and also do not propel the cut twisted casings TC from the sausage mouths 46,48 as well as knives 70,72. From a side view, the blade portions 120 are also inclined at a 25° angle (FIG. 1).

Once the twisted casing TC is cut, the actuator lever 92 is spring-returned to its starting position which breaks the contacts of the micro-switch assembly 94. This returns the sausage cutter 10 to its starting position. Signal air is removed from the first pilot valve 88, deactivating the valve 88 wherein working air is supplied from the first supply conduit 98 through the detensioning conduit 105 to return the tensioning cylinder 76 to its starting position, and thus the first sausage mouth 46 to its initially spaced position. The deactivation of the first pilot valve 88, in turn, deactivates the second pilot valve 90. This sends working air from the second supply conduit 100 to the return conduits 110 to retract the cutting cylinders 66,68 returning the knives 70,72 to their starting positions. The pilot valves 88,90 have built-in exhaust ports (not shown) to exhaust the air from its one outlet while supplying air through its the other outlet, allowing the sausage cutter 10 to proceed from its starting position to its cutting position and vice versa. The one sausage S1 is now separated and the process can be repeated for the next twisted casing TC2.

It must be appreciated that the above-described separating process is completed within a fraction of a second. As soon as the micro-switch assembly 94 is actuated, the twisted casing TC is immediately stretched and then immediately cut by the knives 70,72. Thus, the machine is very efficient and can separate a string of sausages S very quickly. Depending also on the individual speed of the operator, 60–80 cuts can be made in a minute.

The unique configuration of the sausage cutter 10 allows for its quick and efficient operation. Because the twisted casing TC is stretched before cutting, the cut is made faster while needing less force to make the cut. This, in turn, allows the use of smaller, less expensive air cylinders and also uses less compressed air saving in operation costs. The unique configuration of the pneumatic system 20 also improves the speed and efficiency of the sausage cutter 10. The tensioning conduit 104 and cutting conduit 108 are dimensioned such that as soon the twisted casing TC is stretched, the knives 70,72 immediately cut the twisted casing TC. Because the second signal conduit 106 is branched off of the tensioning conduit 104, it takes more time for the second pilot valve 90 to be activated and thus operate the knives 70,72. In such configuration, the knives 70,72 are activated a fraction after the tensioning cylinder 76 is activated. Thus, the knives 70,72 cut the twisted casing TC immediately after it has been stretched.

Preferably, by branching the second signal conduit 106 from the tensioning conduit 104, an automatic time delay is built-in to the pneumatic system 20. As an alternative to this configuration, it is also contemplated that the actual length of the air conduits 98,104 and 100,108 could be varied to assure that the knives 70,72 are activated a fraction after the tensioning cylinder 76 is activated. In addition, time delay valves or electrical timing circuits could be utilized. The alternative configurations may not operate the sausage cutter 10 as quickly as the present configuration.

Also, with very little moving parts and being completely pneumatically-powered, manufacturing, operating and maintenance costs are kept to a minimum. The sausage cutter can also be easily cleaned.

Other useful features are also provided with the sausage cutter 10. If a string of sausages having a larger diameter than shown in FIG. 2 are to be processed, the height of the sausage mouths 46,48 with respect to the table 40 can be adjusted. The vertical adjusting members 60,62 are rotated to move the support bracket 34 and second mounting bracket 52 towards the table 40. This, in turn, heightens the sausage mouths 46,48 with respect to the table 40. In this way, the operator can easily slide twisted casings between larger sausages into the slots 54 of the sausage mouths 46,48. Obviously, the sausage mouths 46,48 can also be lowered by the adjusting members 60,62. Also, the initial spacing of the sausage mouths 46,48 can be adjusted to a predetermined distance to accommodate a string of sausages having twisted casings of a different length. For example, if the twisted casings were slightly longer than shown in FIG. 2, the adjusting member 82 is rotated to move the tension bracket 78, and therefore the first sausage mouth 46, away from second sausage mouth 48. If the twisted casings were shorter, the adjusting member is rotated the other way to move the first sausage mouth 46 closer to the second sausage mouth 48.

It is understood that other means well known in the art could be utilized to operate the tensioning mechanism and cutting mechanism including electrical and hydraulic means. Pneumatically-powered air cylinders, however, are preferred.

It is also possible that an automated system could be used to feed a string of sausages into the sausage cutter 10. The benefits of this machine, however, are best realized through manual operation. Because the operator is placing the twisted casing into the sausage mouths set at a predetermined distance, there is practically no chance for a sausage link to be accidentally severed in two. Complex, costly sensing mechanisms, thus, are not required.

While particular embodiments of the invention have been shown and described, it will be obvious to those skilled in the art that changes and modifications of the present invention, in its various aspects, may be made without departing from the invention in its broader aspects, some of which changes and modifications being matters of routine engineering or design, and other being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

I claim:

1. An apparatus for separating a string of sausages connected by twisted casings comprising:
   a pair of sausage mouths dimensioned to receive a twisted casing connecting adjacent sausages;
   means for moving one of the sausage mouths relative to the other sausage mouth to stretch the twisted casing and define a stretched position;
   means for severing the twisted casing while in the stretched position; and,
   an actuator in communication with the moving means and severing means, the actuator positioned between the sausage mouths for displacement by the twisted casing received by the sausage mouths to activate the moving means and the severing means.

2. The apparatus of claim 1 wherein the moving means is a fluid cylinder having a fixed end and an extendable end connected to the one sausage mouth.

3. The apparatus of claim 1 wherein the severing means is a knife mounted for movement on a cutting fluid cylinder having a fixed end and an extendable end connected to the knife.

4. The apparatus of claim 3 wherein the knife has a blade having a first inclined portion adjoining a second inclined portion.

5. The apparatus of claim 3 wherein the severing means further includes a second knife mounted for movement on a second cutting fluid cylinder having a fixed end and an extendable end connected to the second knife.

6. The apparatus of claim 5 wherein the first knife is movably supported in the first sausage mouth and the second knife is movably supported in the second sausage mouth.

7. The apparatus of claim 6 wherein each sausage mouth has a groove for movably supporting a knife and further including a recess to accommodate a tapered end of a sausage.

8. The apparatus of claim 1 further including a support frame having a table for supporting the string of sausages, the table having an opening through which the sausage mouths extend.

9. The apparatus of claim 8 wherein one sausage mouth is mounted to the support frame for movement with respect to the other sausage mouth and wherein the pair of sausage mouths are spaced from one another to define a predetermined distance and including means for adjusting the predetermined distance.

10. The apparatus of claim 1 wherein each sausage mouth has a slot for receiving the twisted casing.

11. An air-powered apparatus for separating a string of sausages connected by twisted casings comprising:
    a first sausage mouth spaced from a second sausage mouth defining a cutting zone, each sausage mouth having a slot for receiving a twisted casing connecting adjacent sausages;
    a first knife movably supported in the first sausage mouth;
    a second knife movably supported in the second sausage mouth;
    a tensioning cylinder having a fixed end and an extendable end connected to the first sausage mouth for moving the first sausage mouth relative to the second sausage mouth to stretch the twisted casing;
    a first cutting cylinder having a fixed end and an extendable end connected to the first knife for moving the first knife into the cutting zone for severing the twisted casing;
    a second cutting cylinder having an extendable end connected to the second knife for moving the second knife into the cutting zone for severing the twisted casing;
    a first pilot valve for delivering compressed air to the tensioning cylinder, the first pilot valve having a signal inlet and an outlet;
    a second pilot valve for delivering compressed air to the cutting cylinders, the second pilot having a signal inlet and an outlet;
    a supply conduit for connecting a compressed air source to the outlets of the first pilot valve and second pilot valve;
    a tensioning conduit connecting the outlet of the first pilot to the tensioning air cylinder;
    a cutting conduit connecting the outlet of the second pilot to the cutting cylinders;
    a first signal conduit connecting the compressed air source to the signal inlet of the first pilot valve; and,
    a second signal conduit having one end connected to the tensioning conduit and another end connected to the signal inlet of the second pilot.

12. An apparatus for separating a string of sausages connected by twisted casings comprising:
    a pair of sausage mouths dimensioned to receive a twisted casing connecting adjacent sausages;
    a support frame having a table for supporting the string of sausages, the table having an opening through which the sausage mouths extend, and wherein the sausage mouths are mounted to the support frame for vertical movement with respect to the table, the support frame having means for adjusting the vertical position of the sausage mouths for the mouths to receive twisted casings from strings of sausages having different diameters;
    means for moving one of the sausage mouths relative to the other sausage mouth to stretch the twisted casing and define a stretched position; and,
    means for severing the twisted casing while in the stretched position.

13. An apparatus for separating a string of sausages connected by twisted casings comprising:
    a pair of sausage mouths dimensioned to receive a twisted casing connecting adjacent sausages;
    a tensioning mechanism to stretch the twisted casing to define a stretched position;
    a cutting mechanism for severing the twisted casing while in the stretched position;
    a first pilot valve for delivering compressed air to the tensioning mechanism, the first pilot having a signal inlet and an outlet;
    a second pilot valve for delivering compressed air to the cutting mechanism, the second pilot having a signal inlet and an outlet;

means for activating the first pilot signal inlet to deliver compressed air to the tensioning mechanism; and, means in response to the activation of the first pilot for activating the second pilot signal inlet to deliver compressed air to the cutting mechanism.

14. The apparatus of claim 13 wherein the means for activating the second pilot is a second signal conduit having one end connected to the outlet of the first pilot and another end connected to the signal inlet of the second pilot.

15. The apparatus of claim 14 further including a tensioning conduit connecting the outlet of the first pilot to the tensioning mechanism, and wherein the second signal conduit has its one end connected to the tensioning conduit.

16. The apparatus of claim 13 wherein the means for activating the first pilot signal inlet is a first signal conduit for delivering compressed air from a compressed air source to the signal inlet of the first pilot valve.

17. The apparatus of claim 16 further including a microswitch assembly between the compressed air source and the signal inlet of the first pilot valve.

18. The apparatus of claim 13 further including a cutting conduit having one end connected to the outlet of the second pilot valve and another end connected to the cutting mechanism.

19. The apparatus of claim 13 further including a safety valve located between an external compressed air source and the first pilot valve to prevent operation of the apparatus.

* * * * *

UNITED STATES PATENT AND TRADEMARK OFFICE
CERTIFICATE OF CORRECTION

PATENT NO. : 5,816,903

DATED : October 6, 1998

INVENTOR(S) : Idziak

It is certified that error appears in the above-identified patent and that said Letters Patent is hereby corrected as shown below:

IN THE DRAWINGS:

Delete the title page and replace with the attach title page.

The drawings Sheets 1 of 4 through 4 of 4, consisting of Figs. 1 - 6, should be deleted and replaced with the attached sheets.

United States Patent

Idziak

Patent Number: 5,816,903
Date of Patent: Oct. 6, 1998

[54] APPARATUS FOR SEPARATING SAUSAGES

[76] Inventor: Peter Idziak, 5958 S. Kostner Ave., Chicago, Ill. 60629

[21] Appl. No.: 649,028

[22] Filed: May 16, 1996

[51] Int. Cl.$^6$ ............................................. A22C 11/00
[52] U.S. Cl. ..................................... 452/49; 452/48
[58] Field of Search ........................... 452/49, 48

[56] References Cited

U.S. PATENT DOCUMENTS

| | | |
|---|---|---|
| 3,716,891 | 2/1973 | Demarest . |
| 3,808,636 | 5/1974 | Gouba . |
| 3,840,937 | 10/1974 | Berg et al. . |
| 4,104,763 | 8/1978 | Tetsuro . |
| 4,194,268 | 3/1980 | Deerwester ........................ 452/49 |
| 4,214,492 | 7/1980 | Hoffman ........................... 452/49 |
| 4,233,709 | 11/1980 | Smith et al. . |
| 4,322,871 | 4/1982 | Townsend et al. . |
| 4,366,600 | 1/1983 | Townsend et al. . |
| 4,373,231 | 2/1983 | Mano . |
| 4,438,545 | 3/1984 | Kupcikevicius et al. ............ 452/48 |
| 4,463,477 | 8/1984 | Ziolko . |
| 4,463,641 | 8/1984 | Sato . |
| 4,584,740 | 4/1986 | Townsend . |
| 4,847,951 | 7/1989 | Kollross ........................... 452/48 |
| 5,131,884 | 7/1992 | Melanson et al. . |

*Primary Examiner*—Willis Little
*Attorney, Agent, or Firm*—Wallenstein & Wagner, Ltd.

[57] ABSTRACT

An air-powered apparatus (10) for separating a string of sausages (S) connected by twisted casings (TC) is provided. The apparatus (10) has a first sausage mouth (46) spaced from a second sausage mouth (48) defining a cutting zone (C). Each sausage mouth (46,48) has a slot (54) for receiving a twisted casing (TC) connecting adjacent sausages. A first knife (70) is movably supported in the first sausage mouth (46), and a second knife (72) movably supported in the second sausage mouth (48). A tensioning cylinder (76) has a fixed end and an extendable end connected to the first sausage mouth (46) to move the first sausage mouth (46) relative to the second sausage mouth (48) to stretch the twisted casing (TC). A first cutting cylinder (66) has a fixed end and an extendable end connected to the first knife (70) for moving the first knife (70) into the cutting zone (C). A second cutting cylinder (68) has an extendable end connected to the second knife (72) for moving the second knife (72) into the cutting zone (C). A first pilot valve (88) is provided where, upon actuation, the first pilot valve (88) delivers fluid to the tensioning cylinder (76) to stretch the twisted casing (TC). A second pilot valve (90) is provided where, in response to the actuation of the first pilot valve (88), the second pilot valve (88) is actuated which delivers fluid to the cutting cylinders (66,68) to immediately sever the twisted casing (TC).

19 Claims, 4 Drawing Sheets

UNITED STATES PATENT AND TRADEMARK OFFICE
CERTIFICATE OF CORRECTION

PATENT NO. : 5,816,903
DATED : October 6, 1998
INVENTOR(S) : Idziak

Page 3 of 8

It is certified that error appears in the above-identified patent and that said Letters Patent is hereby corrected as shown below:

FIG.1

UNITED STATES PATENT AND TRADEMARK OFFICE
CERTIFICATE OF CORRECTION

PATENT NO. : 5,816,903    Page 4 of 8
DATED : October 6, 1998
INVENTOR(S) : Idziak It is certified that error appears in the above-identified patent and that said Letters Patent is hereby corrected as shown below:

UNITED STATES PATENT AND TRADEMARK OFFICE
CERTIFICATE OF CORRECTION

PATENT NO. : 5,816,903

DATED : October 6, 1998

INVENTOR(S) : Idziak

Page 5 of 8

It is certified that error appears in the above-identified patent and that said Letters Patent is hereby corrected as shown below:

UNITED STATES PATENT AND TRADEMARK OFFICE
CERTIFICATE OF CORRECTION

PATENT NO. : 5,816,903

DATED : October 6, 1998

INVENTOR(S) : Idziak

Page 6 of 8

It is certified that error appears in the above-identified patent and that said Letters Patent is hereby corrected as shown below:

UNITED STATES PATENT AND TRADEMARK OFFICE
CERTIFICATE OF CORRECTION

PATENT NO. : 5,816,903
DATED : October 6, 1998
INVENTOR(S) : Idziak

It is certified that error appears in the above-identified patent and that said Letters Patent is hereby corrected as shown below:

UNITED STATES PATENT AND TRADEMARK OFFICE
CERTIFICATE OF CORRECTION

PATENT NO. : 5,816,903

DATED : October 6, 1998

INVENTOR(S) : Idziak

Page 8 of 8

It is certified that error appears in the above-identified patent and that said Letters Patent is hereby corrected as shown below:

FIG. 7

Signed and Sealed this

Eighteenth Day of May, 1999

Attest:

Q. TODD DICKINSON

*Attesting Officer*    *Acting Commissioner of Patents and Trademarks*